United States Patent
Murata et al.

[11] Patent Number: 5,991,093
[45] Date of Patent: Nov. 23, 1999

[54] SOFT-FOCUS ZOOM LENS SYSTEM

[75] Inventors: Masayuki Murata; Takayuki Ito, both of Saitama, Japan

[73] Assignee: Asahi Kogaku Kogyo Kabushiki Kaisha, Tokyo, Japan

[21] Appl. No.: 09/161,310

[22] Filed: Sep. 28, 1998

[30] Foreign Application Priority Data

Oct. 2, 1997 [JP] Japan .................................. 9-269694

[51] Int. Cl.$^6$ .................................................. G02B 15/14
[52] U.S. Cl. ........................................ 359/691; 359/686
[58] Field of Search .................................. 359/691, 690, 359/689, 686

[56] References Cited

U.S. PATENT DOCUMENTS

| | | | |
|---|---|---|---|
| 4,241,981 | 12/1980 | Okudaira | 359/708 |
| 4,781,446 | 11/1988 | Tanaka et al. | 359/707 |
| 5,267,086 | 11/1993 | Hirano | 359/707 |
| 5,448,412 | 9/1995 | Maruyama et al. | 359/691 |
| 5,822,132 | 10/1998 | Hirakawa | 359/691 |

FOREIGN PATENT DOCUMENTS 9-179023  7/1997  Japan .

Primary Examiner—Scott J. Sugarman
Attorney, Agent, or Firm—Greenblum & Bernstein, P.L.C.

[57] ABSTRACT

A soft-focus zoom lens system comprises a negative front lens group and a positive rear lens group, both of which are arranged to perform a zooming operation by moving the first lens group and the second lens group, by varying the distance between the negative front lens group and the positive rear lens group, wherein the soft-focus zoom lens system satisfies the following conditions:

$$SAU/f_W < -0.10 \qquad (1)$$

$$0.8 < D_W/f_W < 2.0 \qquad (2)$$

wherein:

$SAU$ designates the amount of marginal spherical aberration at the short focal-length extremity under the full open aperture condition;

$f_W$ designates the focal-length of the entire lens system at the short focal-length extremity; and $D_W$ designates the axial distance between the front lens group and the rear lens group at the short focal-length extremity.

11 Claims, 8 Drawing Sheets

SPHERICAL ABERRATION

THE SINE CONDITION

LATERAL CHROMATIC ABERRATION

ASTIGMATISM

DISTORTION

SPHERICAL
ABERRATION

THE SINE
CONDITION

LATERAL
CHROMATIC
ABERRATION

ASTIGMATISM

DISTORTION

SPHERICAL
ABERRATION

THE SINE
CONDITION

LATERAL
CHROMATIC
ABERRATION

ASTIGMATISM

DISTORTION

SPHERICAL
ABERRATION
THE SINE
CONDITION

LATERAL
CHROMATIC
ABERRATION

ASTIGMATISM

DISTORTION

1:4.0

— SA
-- SC

-5.0  5.0

SPHERICAL
ABERRATION

THE SINE
CONDITION w=22.5°

····· g LINE
---- c LINE

-0.01  0.01

LATERAL
CHROMATIC
ABERRATION w=22.5°

— S
-- M

-1.0  1.0

ASTIGMATISM w=22.5°

-5.0 % 5.0

DISTORTION

1:4.0

— SA
-- SC

-5.0  5.0

SPHERICAL
ABERRATION

THE SINE
CONDITION w=17.3°

····· g LINE
---- c LINE

-0.01  0.01

LATERAL
CHROMATIC
ABERRATION w=17.3°

— S
-- M

-1.0  1.0

ASTIGMATISM w=17.3°

-5.0 % 5.0

DISTORTION

SPHERICAL ABERRATION
THE SINE CONDITION

LATERAL CHROMATIC ABERRATION

ASTIGMATISM

DISTORTION

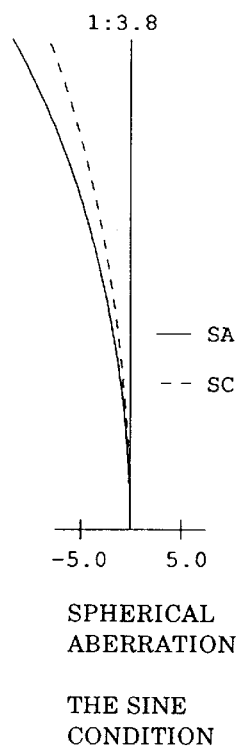
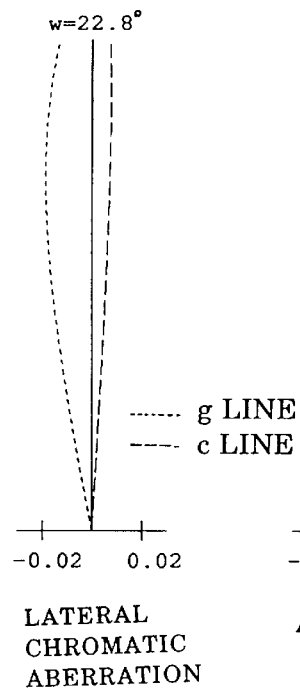
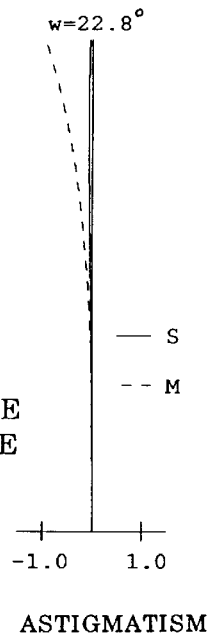
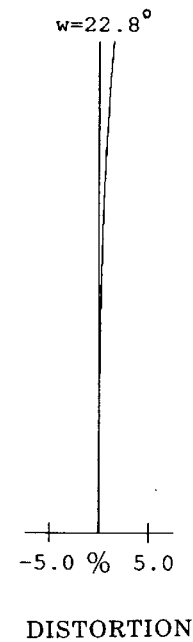
Fig.11A SPHERICAL ABERRATION THE SINE CONDITION
Fig.11B LATERAL CHROMATIC ABERRATION
Fig.11C ASTIGMATISM
Fig.11D DISTORTION
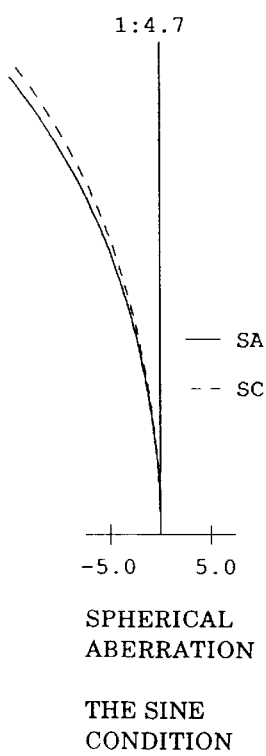
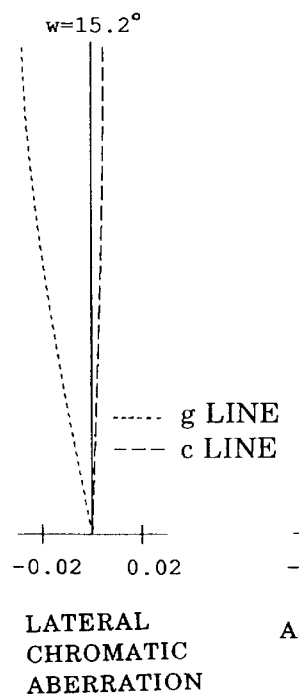
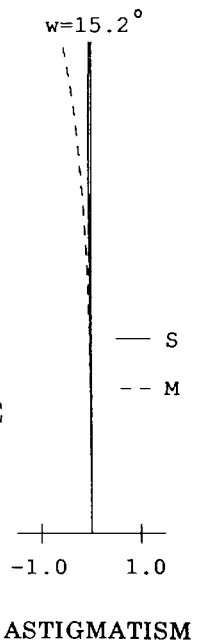
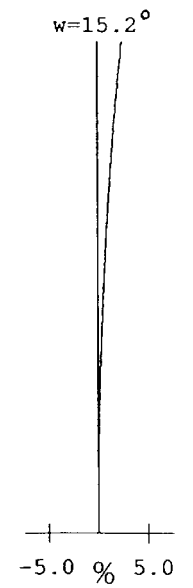
Fig.12A SPHERICAL ABERRATION THE SINE CONDITION
Fig.12B LATERAL CHROMATIC ABERRATION
Fig.12C ASTIGMATISM
Fig.12D DISTORTION

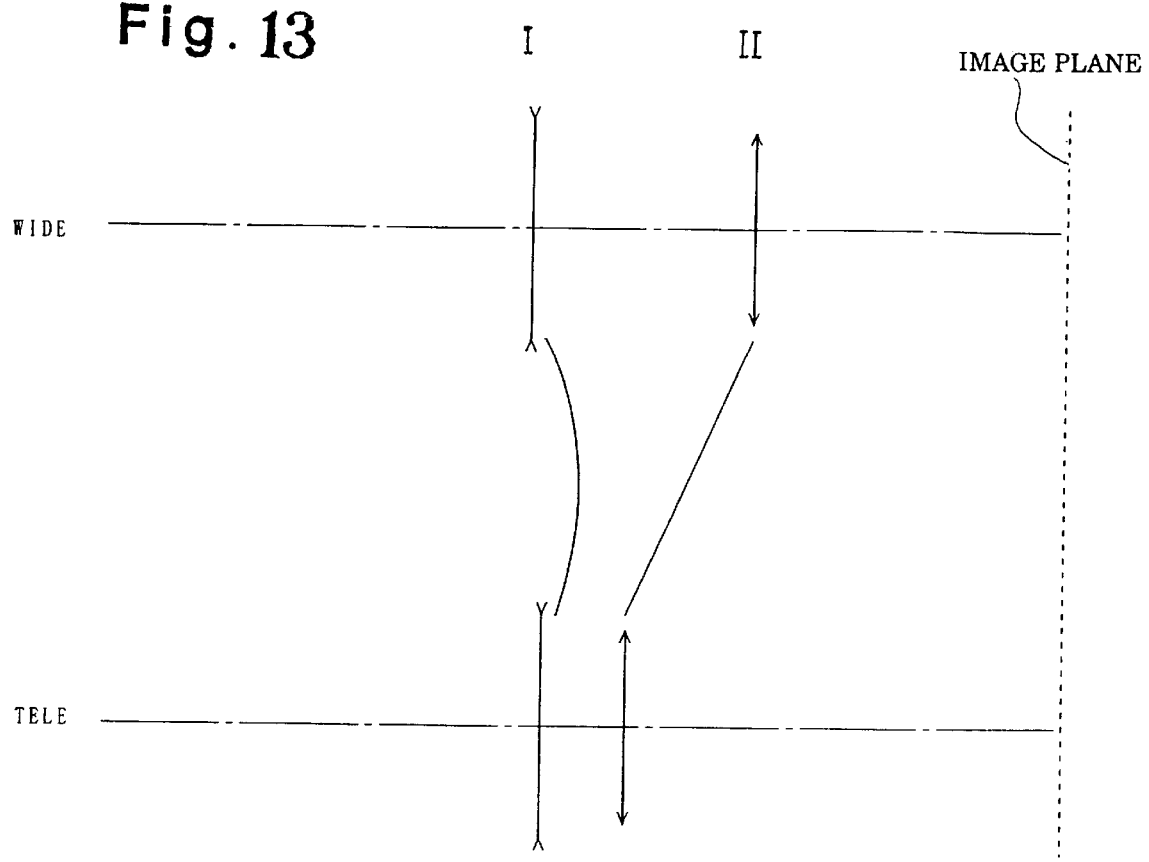

SOFT-FOCUS ZOOM LENS SYSTEM

BACKGROUND OF THE INVENTION

1. Field of the Invention

The present invention relates to a soft-focus zoom lens system which is incorporated in a zoom lens mainly used as an interchangeable lens for a single reflex camera.

2. Description of the Related Art

A soft focus lens system, mainly for portraits, has been utilized in a telephoto lens system having a relatively narrower angle of view. On the other hand, a wideangle lens system having a wider angle of view has recently employed a soft-focus lens system for the purpose of obtaining soft-focus effects in a distant scenic views such as landscapes. However, there has not as yet been provided a soft-focus zoom lens system that can maintain soft-focus effects in the range of a wideangle to a telephoto-angle.

SUMMARY OF THE INVENTION

It is the object of the present invention to provide a soft-focus zoom lens system which enables to take both distant and near views, such as a landscape and a portrait, with soft-focus effects.

According to an aspect of the present invention, there is provided a soft-focus zoom lens system comprises a negative front lens group and a positive rear lens group, both of which are arranged to perform a zooming operation by moving the first lens group and the second lens group, and by varying the distance between the negative front lens group and the positive rear lens group, wherein the soft-focus zoom lens system satisfies the following conditions:

$$\text{SAU}/f_W < -0.10 \quad (1)$$

$$0.8 < D_W/f_W < 2.0 \quad (2)$$

wherein:

SAU designates the amount of marginal spherical aberration at the short focal-length extremity under the full open aperture condition;

$f_W$ designates the focal-length of the entire lens system at the short focal-length extremity; and $D_W$ designates the axial distance between the front lens group and the rear lens group at the short focal-length extremity.

Preferably, the soft-focus zoom lens system satisfies the following condition:

$$-2 < f_W/f_F < -0.5 \quad (3)$$

wherein $f_F$ designates the focal-length of the front lens group.

Furthermore, it is preferable for the soft-focus zoom lens system to mainly generate spherical aberration while to suppress other off-axis aberrations as much as possible. To comply with this requirement, the lens system according to the present invention preferably satisfies the following condition:

$$0.5 < r_{R-1}/f_W < 1.4 \quad (4)$$

wherein $r_{R-1}$ designates the radius of curvature of the object side surface of the positive lens element that is positioned at the most object side among positive lens elements in the rear lens group.

In addition to the above, the soft-focus zoom lens system according to the present invention preferably satisfies the following condition:

$$25° < W_W \quad (5)$$

wherein:

$W_W$ designates the half angle of view at the short focal-length extremity.

In the present invention, it should also be noted that the soft-focus zoom lens system of the present invention can be arranged to divide the rear lens group into two or three sub lens groups, which are made relatively movable upon zooming, while the distance between the front lens group and the rear lens group is also varied upon zooming.

The present disclosure relates to subject matter contained in Japanese Patent Application No.9-269694 (filed on Oct. 2, 1997) which is expressly incorporated herein by reference in its entirety.

BRIEF DESCRIPTION OF THE DRAWINGS

The invention will be discussed below in detail with reference to the accompanying drawings, in which:

FIGS. 11A, 11B, 11C and 11D are aberration diagrams of the lens system of FIG. 9 at an intermediate focal-length position;

FIGS. 12A, 12B, 12C and 12D are aberration diagrams of the lens system of FIG. 9 at the long focal-length extremity;

FIG. 13 is the zooming paths of the zoom lens system according to the first and second embodiments of the present invention.

DESCRIPTION OF THE PREFERRED EMBODIMENT

The soft-focus lens system according to one of the embodiments of the present invention is based on an optical system of a retrofocus type lens system with two lens groups which includes, as shown in FIG. 13, a negative front lens group I and a positive rear lens group II in this order from the object side, and zooming is performed by varying the distance between the front and rear lens groups I and II. As shown in the zooming paths of FIG. 13, in a zooming operation from the short focal-length extremity (wideangle extremity) to the long focal-length extremity (telephoto extremity) over the zooming range, the distance between the two lens groups decreases while the front lens group is moved toward the image side and the rear lens group is moved toward the object side.

Figure 14:
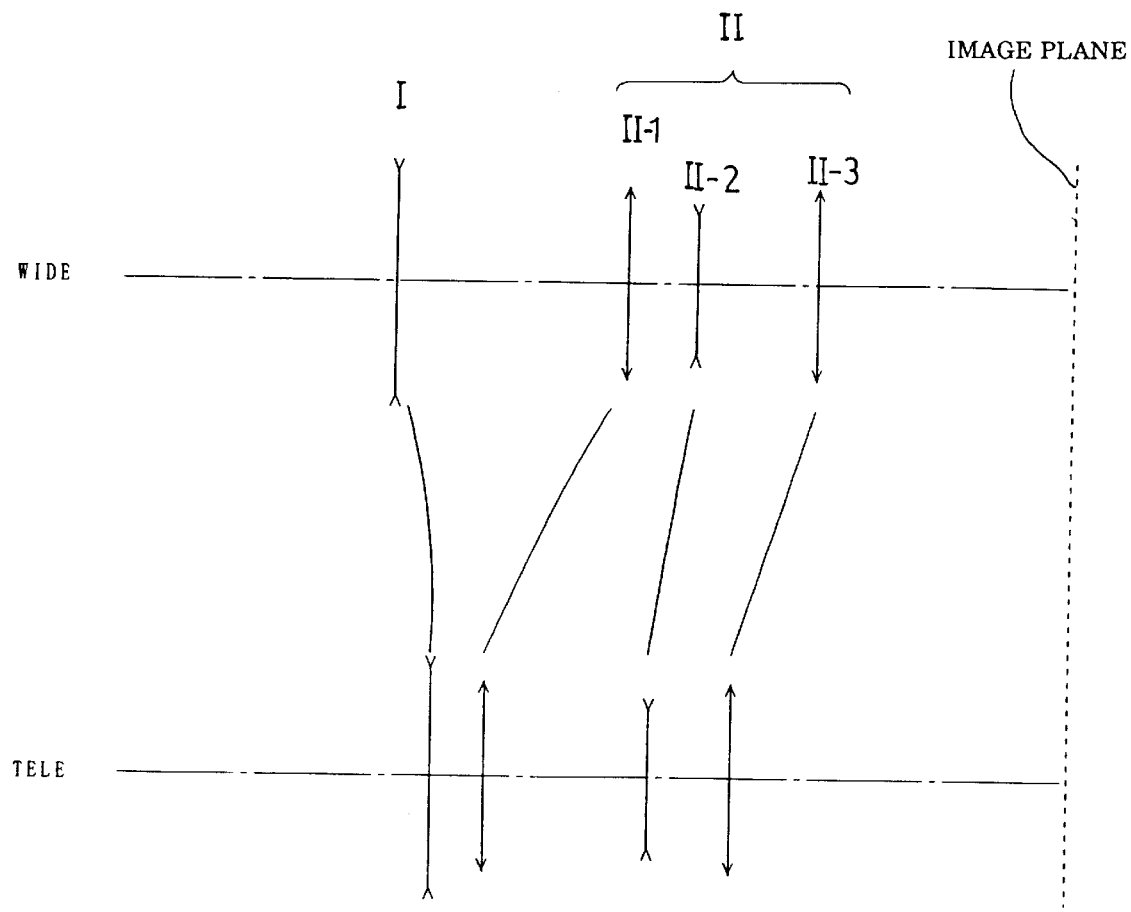
FIG. 14 is the zooming paths of the zoom lens system according to the third embodiment of the present invention.

The soft-focus lens system can also be applied to a retrofocus type lens system with four lens groups, as shown in FIG. 14. In a zooming operation from the short focal-length extremity to the long focal-length extremity over the zooming range, the distance among the four lens groups vary while the most object side lens group is moved toward the image side and the rest of the lens groups are moved toward the object side.

Note that the zooming paths shown in FIG. 13 represents the first and second embodiments which will be discussed, and the zooming paths shown in FIG. 14 represents the third embodiment which will also be discussed.

Condition (1) indicates the ratio defined by spherical aberration with an full open aperture at the short focal-length extremity and the focal-length of the entire lens system at the short focal-length extremity. When this condition is satisfied, undercorrected spherical aberration occurs, so that soft-focus effects in the range of the short focal-length extremity to the long focal-length extremity can be obtained, moreover, a softly defocused background can effectively be portrayed.

If $SAU/f_W$ exceeds the upper limit, spherical aberration occurs a little, and sufficient soft-focus effect cannot be obtained. Note that the above "undercorrected" spherical aberration is a curved line SA in the minus direction (toward −5.0) in FIGS. 2A, 3A, 4A, 6A, 7A, 8A, 10A, 11A and 12A.

Condition (2) indicates the ratio defined by an axial distance between the front and rear lens groups at the short focal-length extremity and the focal-length of the entire lens system at the short focal-length extremity to obtain a zoom ratio of 2 or more. If this condition is satisfied, effects of a variable power ratio of 2 or more can be achieved.

If $D_W/f_W$ exceeds the lower limit, the above effects of variable power are decreased and it becomes difficult to achieve a zoom ratio of 2 or more.

If $D_W/f_W$ exceeds the upper limit, a large zoom ratio can be achieved. However, this situation is undesirable because the overall length of the lens system has to be made longer, and in order to ensure sufficient peripheral light the diameter of the front lens group I has to be increased.

Condition (3) indicates the ratio defined by the focal-length of the negative front lens group and the focal-length of the entire lens system at the short focal-length extremity. If this condition is satisfied, the negative power of the front lens group is appropriately adjusted, so that satisfactory image quality can be attained.

If $f_W/f_F$ exceeds the lower limit, the negative power of the front lens becomes too strong, and the fluctuation of field curvature increase upon zooming.

If $f_W/f_F$ exceeds the upper limit, an undesirable situation occurs because the lens diameter of the front lens group becomes too large, or sufficient peripheral light is not secured.

Condition (4) is provided to mainly generate spherical aberration while other off-axis aberrations are suppressed as much as possible. More concretely, undercorrected spherical aberration occurs due to a convex surface with strong power. Accordingly, in the rear lens group II, if the most object side lens element which is closest to the diaphragm s is formed as a convex surface (refer to the 1st and 2nd embodiments), under-spherical-aberration can occur while comatic aberration, astigmatism and distortion are suppressed as much as possible.

If $r_{R-1}/f_W$ exceeds the lower limit, undercorrected spherical aberration does occur, however, it becomes substantially impossible to correct other off-axis aberrations.

If $r_{R-1}/f_W$ exceeds the upper limit, only a little undercorrected spherical aberration occurs, and sufficient soft-focus effects cannot be obtained.

Condition (5) directly determines the half angle of view at the short focal-length extremity. If $W_W$ exceeds the lower limit, the lens system does not provide a half angle of view as a wide angle lens element.

The following are specific examples of the embodiments of the present invention.

[Embodiment 1]

Figure 1:
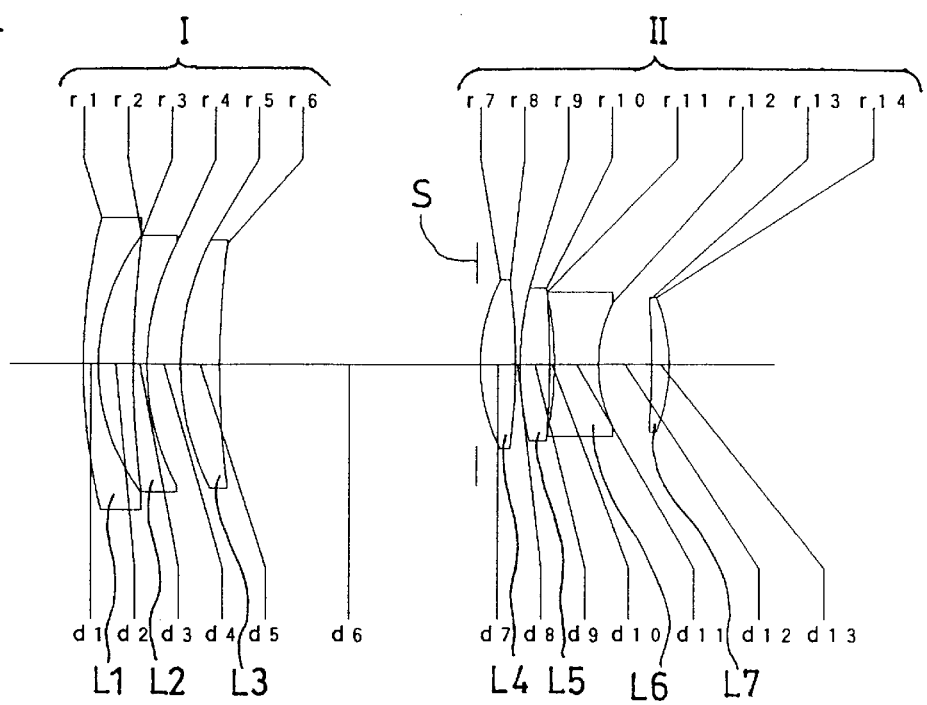
FIG. 1 is the lens arrangement of a soft-focus zoom lens system according to the first embodiment of the present invention.
Figure 2A:
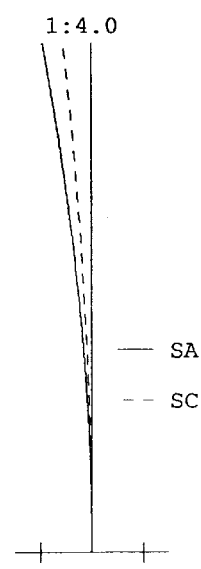
FIGS. 2A, 2B, 2C and 2D are aberration diagrams of the lens system of FIG. 1 at the short focal-length extremity.
Figure 2B:
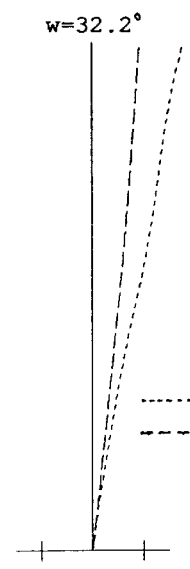
Figure 2C:
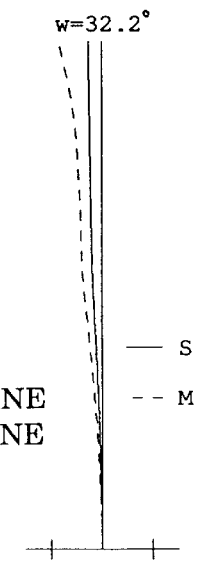
Figure 2D:
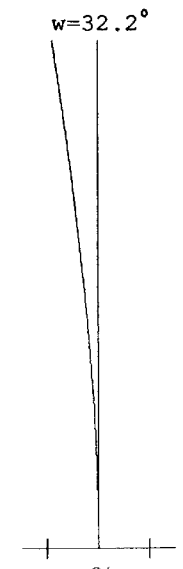
Figure 3A:
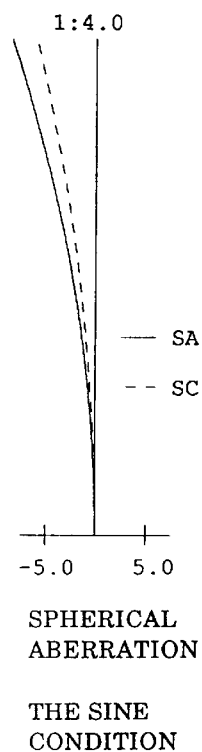
FIGS. 3A, 3B, 3C and 3D are aberration diagrams of the lens system of FIG. 1 at an intermediate focal-length position.
Figure 3B:
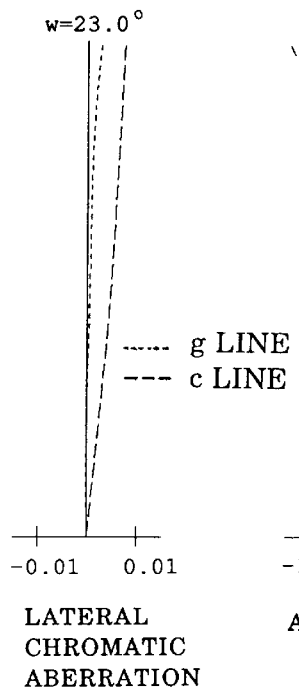
Figure 3C:
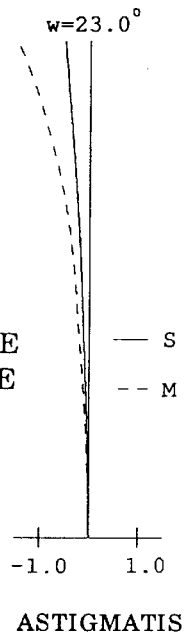
Figure 3D:
Figure 4A:
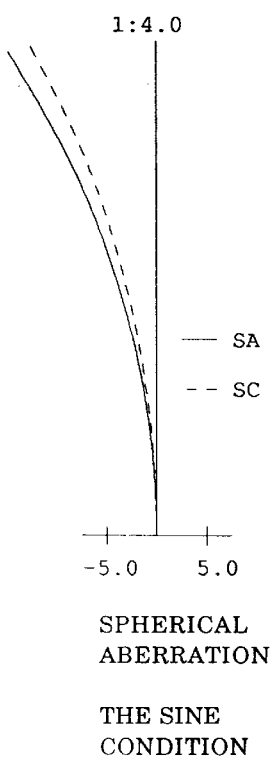
FIGS. 4A, 4B, 4C and 4D are aberration diagrams of the lens system of FIG. 1 at the long focal-length extremity.
Figure 4B:
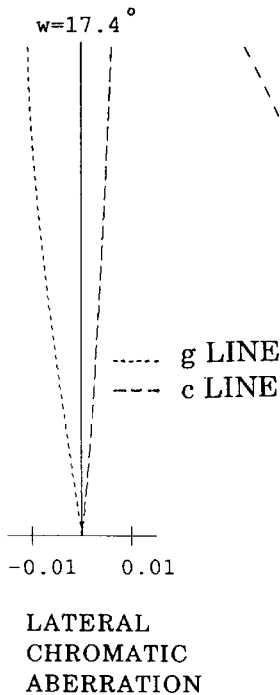
Figure 4C:
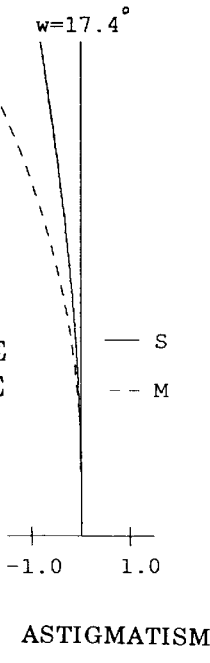
Figure 4D:
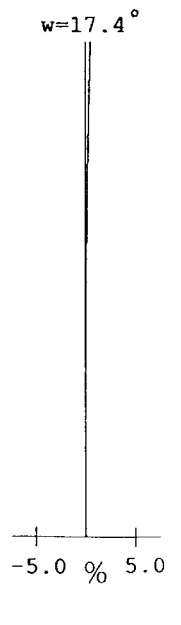

The lens arrangement of the first embodiment is shown in FIG. 1, the lens data of which is shown in Table 1. The lens system according to the first embodiment is composed of a negative front lens group I, a diaphragm S, and a positive rear lens group II from the object side. Zooming is performed by varying the distance between the front lens group I and the rear lens group II. The front lens group I is composed of, in order from the object side, a negative meniscus lens element L1 having a convex surface facing the object side, a negative meniscus lens element L2 having a convex surface facing the object side, and a positive lens element L3 having a convex surface facing the object side. The rear lens group II is composed of, in order from the object side, a positive lens element L4, a positive lens element L5, a negative lens element L6, and a positive lens element L7.

Aberrations at the short focal-length extremity, aberrations at an intermediate focal-length position, and aberrations at the long focal-length extremity are respectively shown in FIGS. 2, 3 and 4. In the aberration diagrams, SA designates spherical aberration, SC designates the sine condition. The g and c lines designate the lateral chromatic aberration at the respective wave length. S designates the sagittal image, and M designates the meridional image.

In the tables and diagrams, $F_{NO}$ designates the F-number, f designates the focal-length, W designates the half angle of view, $f_B$ designates the back focal length, ri designates the radius of curvature of each lens surface, di designates the thickness of lens element or a distance between the lens elements, N designates the refractive index at the d-line, ν represents the Abbe number at the d-line.

TABLE 1

$F_{NO}$ = 1:4.0–4.0–4.0
f = 36.00–51.09–68.50 (zoom ratio = 1.90)
W = 32.2°–23.0°–17.4°
$f_B$ = 44.57–54.86–66.72

| Surface No. | ri | di | N | ν |
| --- | --- | --- | --- | --- |
| 1 | 86.775 | 1.98 | 1.83400 | 37.2 |
| 2 | 30.070 | 4.77 | — | — |
| 3 | 136.513 | 1.88 | 1.77250 | 49.6 |
| 4 | 36.782 | 4.58 | — | — |
| 5 | 38.040 | 5.37 | 1.80518 | 25.4 |
| 6 | 128.178 | 35.21–13.92–1.00 | — | — |

TABLE 1-continued $F_{NO} = 1:4.0–4.0–4.0$
f = 36.00–51.09–68.50 (zoom ratio = 1.90)
W = 32.2°–23.0°–17.4°
$f_B$ = 44.57–54.86–66.72

| Surface No. | ri | di | N | ν |
|---|---|---|---|---|
| Diaphragm | ∞ | 0.50 | — | — |
| 7 | 26.309 | 4.82 | 1.7440 | 44.8 |
| 8 | −90.483 | 0.67 | — | — |
| 9 | 45.895 | 4.04 | 1.65844 | 50.9 |
| 10 | −130.049 | 0.64 | — | — |
| 11 | −48.440 | 6.04 | 1.80518 | 25.4 |
| 12 | 19.918 | 7.33 | — | — |
| 13 | −113.108 | 2.37 | 1.58144 | 40.7 |
| 14 | −25.871 | — | — | — |

[Embodiment 2]

Figure 5:
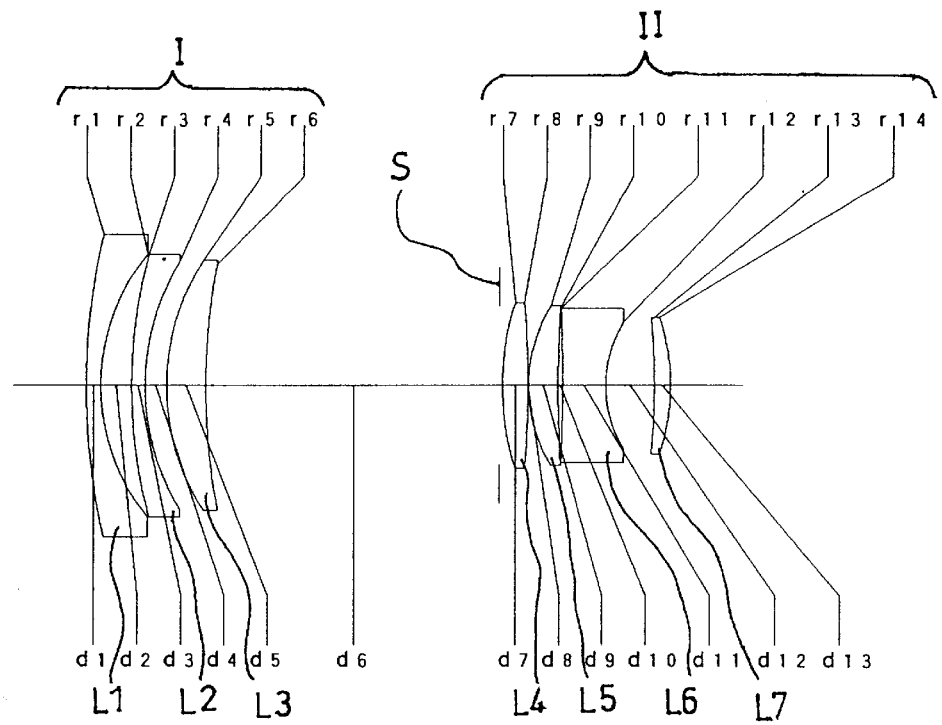
FIG. 5 is the lens arrangement of a soft-focus zoom lens system according to the second embodiment of the present invention.
Figure 6A:
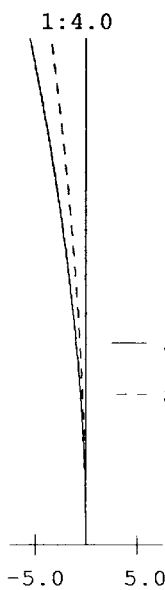
FIGS. 6A, 6B, 6C and 6D are aberration diagrams of the lens system of FIG. 5 at the short focal-length extremity.
Figure 6B:
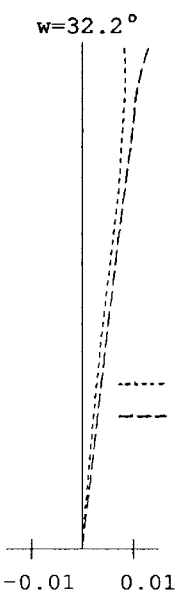
Figure 6C:
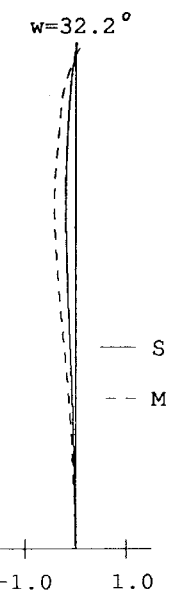
Figure 6D:
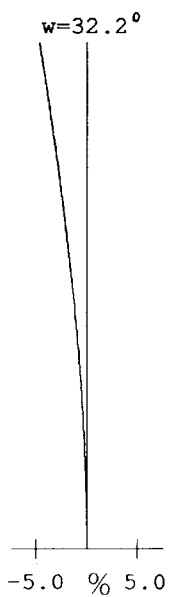
Figure 7A:
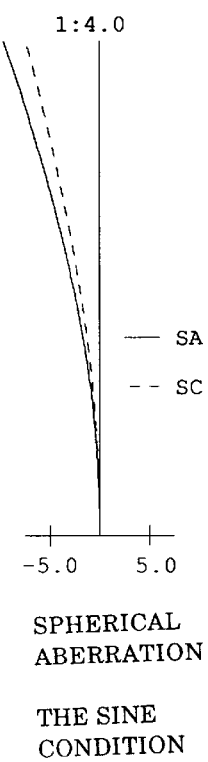
FIGS. 7A, 7B, 7C and 7D are aberration diagrams of the lens system of FIG. 5 at an intermediate focal-length position.
Figure 7B:
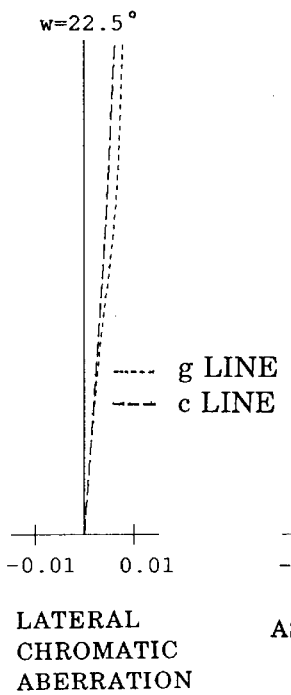
Figure 7C:
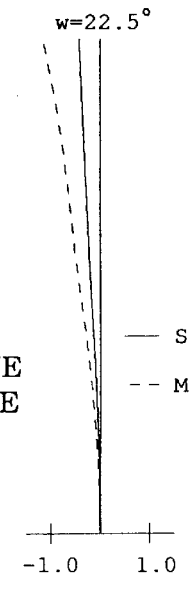
Figure 7D:
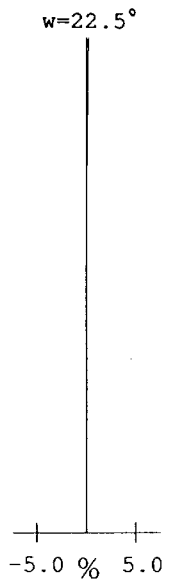
Figure 8A:
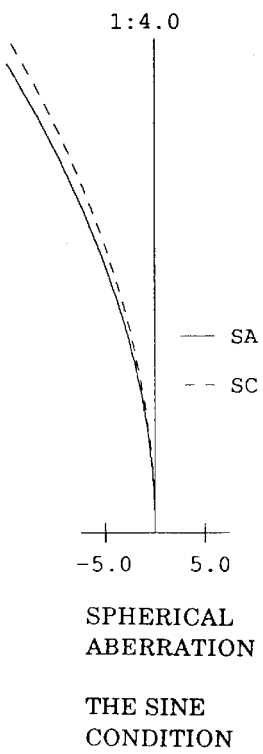
FIGS. 8A, 8B, 8C and 8D are aberration diagrams of the lens system of FIG. 5 at the long focal-length extremity.
Figure 8B:
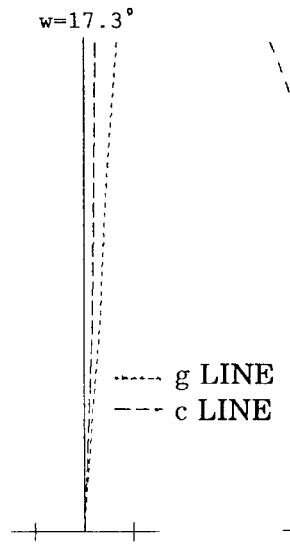
Figure 8C:
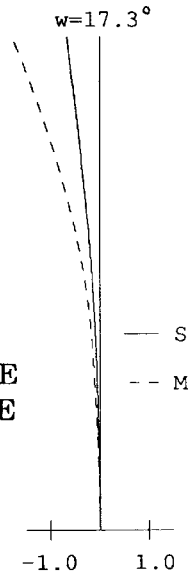
Figure 8D:
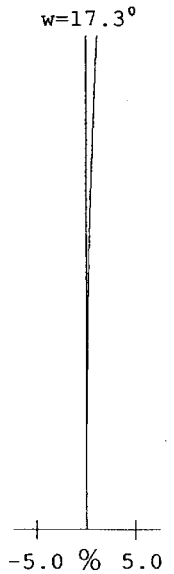

The lens arrangement of the second embodiment is shown in FIG. 5, the numerical data are shown in Table 2. Aberrations at the short focal-length extremity, aberrations at an intermediate focal-length position, and aberrations at the long focal-length extremity for this embodiment are resectively shown in FIGS. 6, 7 and 8. The basic lens arrangement is the same as that of the first embodiment.

TABLE 2

$F_{NO} = 1:4.0–4.0–4.0$
f = 36.00–52.00–68.50 (zoom ratio = 1.90)
W = 32.2°–22.5°–17.3°
$f_B$ = 42.39–52.05–62.02

| Surface No. | ri | di | N | ν |
|---|---|---|---|---|
| 1 | 93.720 | 1.98 | 1.83400 | 37.2 |
| 2 | 28.700 | 4.24 | — | — |
| 3 | 69.120 | 1.88 | 1.80610 | 40.9 |
| 4 | 33.150 | 2.95 | — | — |
| 5 | 31.885 | 5.37 | 1.80518 | 25.4 |
| 6 | 89.072 | 40.61–16.43–3.32 | — | — |
| Diaphragm | ∞ | 0.50 | — | — |
| 7* | 39.600 | 3.50 | 1.7440 | 44.8 |
| 8 | −132.321 | 0.10 | — | — |
| 9 | 21.200 | 4.04 | 1.65844 | 50.9 |
| 10 | 193.485 | 0.64 | — | — |
| 11 | −206.849 | 6.04 | 1.80518 | 25.4 |
| 12 | 16.570 | 6.70 | — | — |
| 13 | −92.459 | 2.23 | 1.58144 | 40.7 |
| 14 | −28.475 | — | — | — |

*indicates the aspherical surface which is symmetrical with respect to the optical axis.

The aspherical surface is generally defined as follows:

$$x = cy^2/\{1+[1-(1+K)c^2y^2]^{1/2}\} + A4y^4 + A6y^6 + A8y^8 + A10y^{10} + A12y^{12} \ldots$$

wherein, y designates a distance from the optical axis;

x designates a distance from a tangent plane of an aspherical vertex;

c designates a curvature of the aspherical vertex (1/r);

K designates a conic constant;

A4 designates a fourth-order aspherical coefficient;

A6 designates a sixth-order aspherical coefficient;

A8 designates a eighth-order aspherical coefficient; and

A10 designates a tenth-order aspherical coefficient;

A11 designates an eleventh-order aspherical coefficient;

A12 designates a twelfth-order aspherical coefficient.

Aspherical Surface Data:

No. 7: K=0.00, A4=0.68301×10−5

[Embodiment 3]

Figure 9:
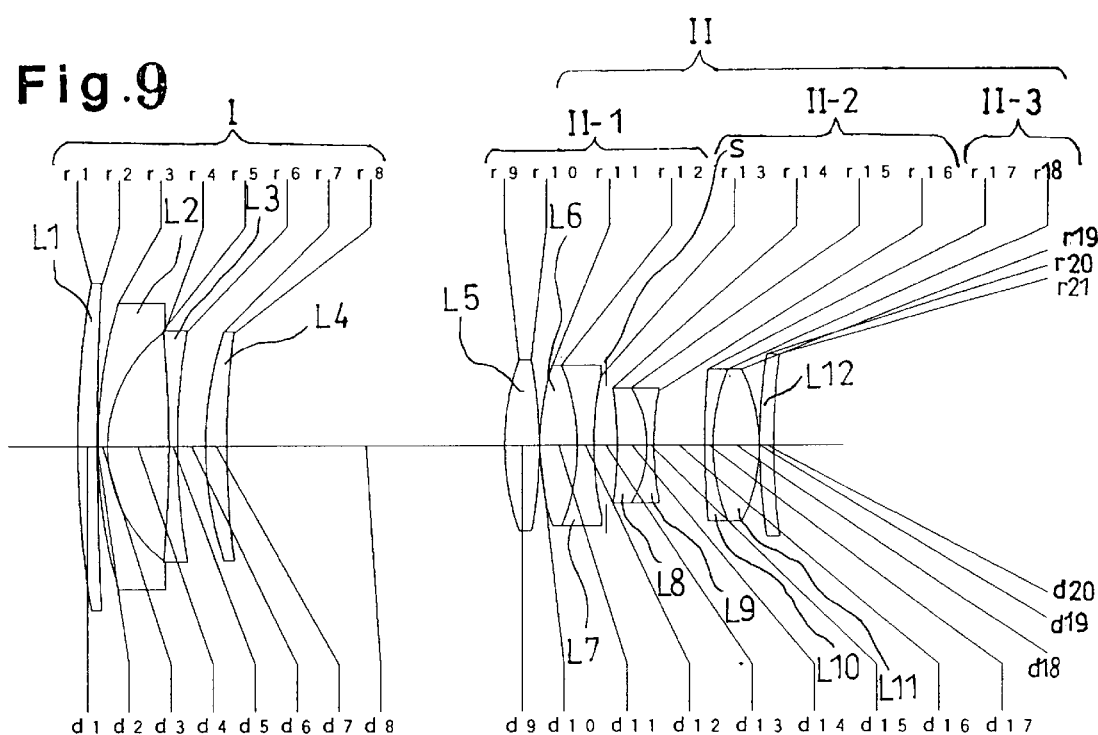
FIG. 9 is the lens arrangement of a soft-focus zoom lens system according to the third embodiment of the present invention.
Figures 10A, 10B, 10C, 10D:
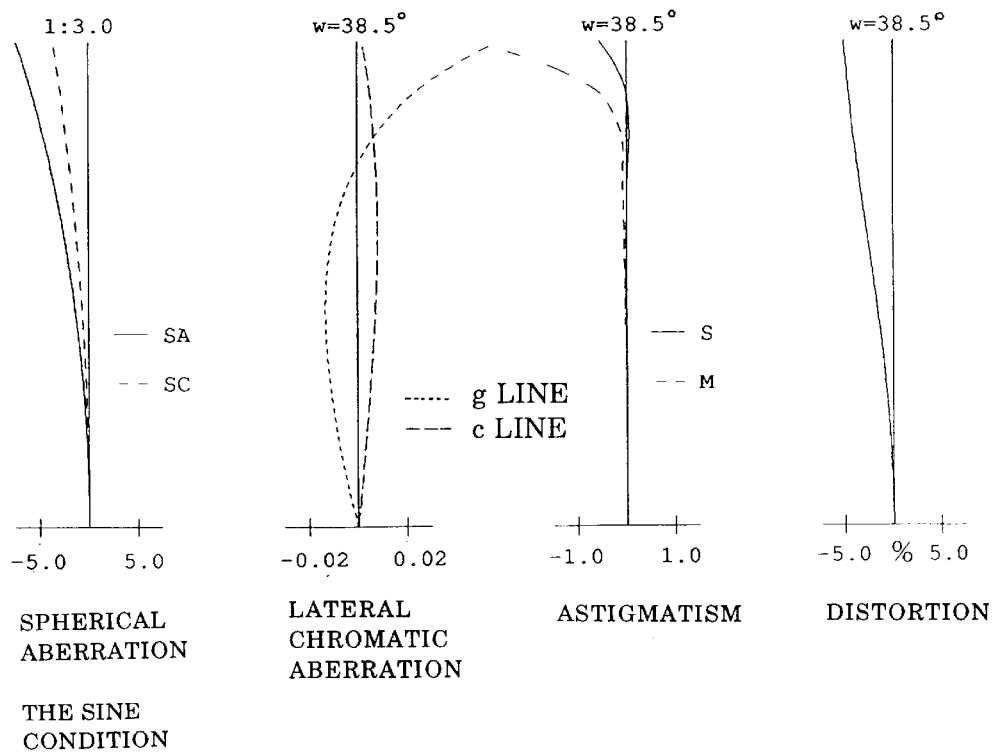
FIGS. 10A, 10B, 10C and 10D are aberration diagrams of the lens system of FIG. 9 at the short focal-length extremity.

The lens arrangement of the third embodiment is shown in FIG. 9, the numerical data are shown in Table 3. Aberrations at the short focal-length extremity, aberrations at an intermediate focal-length position, and aberrations at the long focal-length extremity for this embodiment are respectively shown in FIGS. 10, 11 and 12.

In this embodiment there is provided a negative front lens group I and a positive rear lens group II. The rear lens group II is composed of a first sub lens groups II-1, a second sub lens group II-2 and a third sub lens group II-3, all of which are relatively movable. The diaphragm S is positioned in between the sub lens groups II-1 and II-2. The front lens group I is composed of, in order from the object side, a positive lens element L1 having a convex surface facing the object side, a negative meniscus lens element L2 having a convex surface facing the object side, a negative lens element L3 having a concave surface facing the object side, and a positive lens L4 having a convex surface facing the object side. The first sub lens group II-1 in the rear lens group II is composed of a positive lens element L5, and a cemented lens system composed of a positive lens element L6 and a negative lens element L7, in this order from the object side. The second sub lens group II-2 is a cemented lens system composed of a positive lens element L8 and a negative lens element L9. The third sub lens group II-3 is composed of a cemented lens system having a negative lens element L10 and a positive lens element L11, and a positive (independent) lens element L12, in this order from the object side.

Zooming is performed by varying the lens distance between the front and rear lens groups I and II, and also by varying the distances between the sub lens groups II-1, II-2 and II-3 in the rear lens group II.

TABLE 3

$F_{NO} = 1:4.7–3.8–3.0$
f = 77.43–50.83–28.72 (zoom ratio = 2.70)
W = 15.2°–22.8°–38.5°
$f_B$ = 71.73–55.92–38.72

| Surface No. | ri | di | N | ν |
|---|---|---|---|---|
| 1 | 143.891 | 2.77 | 1.80518 | 25.4 |
| 2 | 453.483 | 0.10 | — | — |
| 3 | 72.535 | 1.40 | 1.77250 | 49.6 |
| 4 | 20.739 | 8.84 | — | — |
| 5 | −181.138 | 1.20 | 1.77250 | 49.6 |
| 6 | 95.501 | 4.02 | — | — |
| 7 | 51.522 | 3.03 | 1.84666 | 23.9 |
| 8 | 123.494 | 1.00–12.98–39.91 | — | — |
| 9 | 38.112 | 4.90 | 1.80400 | 46.6 |
| 10 | −68.211 | 0.10 | — | — |
| 11 | 37.438 | 5.37 | 1.71300 | 53.9 |
| 12 | −31.020 | 2.38 | 1.80518 | 25.4 |
| 13 | 48.271 | 7.16–3.74–1.80 | — | — |
| Diaphragm | ∞ | 1.53 | — | — |
| 14 | −56.973 | 4.29 | 1.80518 | 25.4 |
| 15 | −16.166 | 1.00 | 1.74400 | 44.8 |
| 16 | 42.524 | 1.95–5.38–7.31 | — | — |
| 17 | 134.545 | 1.20 | 1.83400 | 37.2 |
| 18 | 28.241 | 6.63 | 1.48749 | 70.2 |
| 19 | −25.197 | 0.10 | — | — |
| 20 | 84.524 | 2.00 | 1.80610 | 40.9 |
| 21 | 100.566 | — | — | — |

Table 4 shows values for embodiments 1 to 3 for each condition.

TABLE 4

| Condition | Embodiment 1 | Embodiment 2 | Embodiment 3 |
|---|---|---|---|
| (1) | −0.13 | −0.15 | −0.25 |
| (2) | 0.99 | 1.14 | 1.39 |
| (3) | −0.58 | −0.53 | −1.45 |
| (4) | 0.73 | 1.10 | 1.33 |
| (5) | 32.2 | 32.2 | 38.5 |

As can be understood from Table 4, the embodiments 1 through 3 all satisfy conditions (1) through (5). Moreover, as shown in each of the aberration diagrams, the various aberrations are also corrected relatively well.

According to a soft-focus zoom lens system functioning as a wideangle lens system at the wideangle extremity position, the soft-focus effects can be obtained for both distant and near views, such as a landscape and a portrait.

What is claimed is:

1. A soft-focus zoom lens system comprising a negative front lens group and a positive rear lens group, both of which are arranged to perform a zooming operation by moving said first lens group and said second lens group, by varying the distance between said negative front lens group and said positive rear lens group, wherein said soft-focus zoom lens system satisfies the following conditions:

$$SAU/f_W < -0.10$$

$$0.8 < D_W/f_W < 2.0$$

wherein:

SAU designates the amount of marginal spherical aberration at the short focal-length extremity under the full open aperture condition;

$f_W$ designates the focal-length of the entire lens system at the short focal-length extremity; and $D_W$ designates the axial distance between the most image-side surface of said front lens group and the most object-side surface of said rear lens group at the short focal-length extremity.

2. The soft-focus zoom lens system according to claim 1, wherein said lens system further satisfies the following condition:

$$-2 < f_W/f_F < -0.5$$

wherein:

$f_F$ designates the focal-length of said front lens group.

3. The soft-focus zoom lens system according to claim 1, wherein said lens system further satisfies the following condition:

$$0.5 < r_{R-1}/f_W < 1.4$$

wherein:

$r_{R-1}$ designates the radius of curvature of the object side surface of the positive lens element that is positioned closest to the object side, among the positive lens elements in said rear lens group.

4. The soft-focus zoom lens system according to claim 1, wherein said lens system further satisfies the following condition:

$$25° < W_W$$

wherein:

$W_W$ designates the half angle of view at the short focal-length extremity.

5. The soft-focus zoom lens system according to claim 1, wherein said rear lens group comprises a plurality of sub lens groups that are arranged to be relatively movable upon zooming.

6. The soft-focus zoom lens system according to claim 2, wherein the lens system further satisfies the following condition:

$$0.5 < r_{R-1}/f_W < 1.4$$

wherein:

$r_{R-1}$ designates the radius of curvature of the object side surface of the positive lens element that is positioned closest to the object side, among the positive lens element in the rear lens group.

7. The soft-focus zoom lens system according to claim 2, wherein the lens system further satisfies the following condition:

$$25° < W_W$$

wherein:

$W_W$ designates the half angle of view at the short focal-length extremity.

8. The soft-focus zoom lens system according to claim 3, wherein the lens system further satisfies the following condition:

$$25° < W_W$$

wherein:

$W_W$ designates the half angle of view at the short focal-length extremity.

9. The soft-focus zoom lens system according to claim 2, wherein the rear lens group comprises a plurality of sub lens groups that are arranged to be relatively moveable upon zooming.

10. The soft-focus zoom lens system according to claim 3, wherein the rear lens group comprises a plurality of sub lens groups that are arranged to be relatively moveable upon zooming.

11. The soft-focus zoom lens system according to claim 4, wherein the rear lens group comprises a plurality of sub lens groups that are arranged to be relatively moveable upon zooming.

* * * * *